PHONOGRAPH DEVICE

Filed Sept. 22, 1967

INVENTORS
HARRY DISKO
MARVIN I. GLASS
GUNARS LICITIS

BY Lucas & Coffee
ATTORNEYS

United States Patent Office 3,486,756
Patented Dec. 30, 1969

3,486,756

PHONOGRAPH DEVICE

Harry Disko, Park Ridge, Marvin I. Glass, Chicago, and Gunars Licitis, Lombard, Ill., assignors to Glass & Associates, Chicago, Ill., a partnership Filed Sept. 22, 1967, Ser. No. 669,790
Int. Cl. G11b *17/06*
U.S. Cl. 274—14 4 Claims

ABSTRACT OF THE DISCLOSURE

A toy phonograph and jigsaw puzzle combination comprising a housing or frame for a circular jigsaw puzzle, wherein the circumferential margin of the frame includes a circular phonograph record and a sound reproducing device is pivoted at the center of the puzzle frame for circular movement through the path defined by the record. The sound reproducing means is of the acoustical type and comprises a housing pivotally supporting a diaphragm having a stylus fixed to its center. The diaphragm is eccentrically weighted, so that upwardly tilted movement of its supporting arm moves the stylus toward the center of the puzzle frame and in position to engage the innermost groove on the record when the arm and sound reproducing means are again lowered.

BACKGROUND OF THE INVENTION

The present invention relates generally to toys and is particularly concerned with a novel combination of a phonograph device with a circular jigsaw puzzle. While each of the components are generally well-known, there is provided for the first time a simple and inexpensive means for coordinating an appropriate sound recording with an illustrated jigsaw puzzle.

SUMMARY OF THE INVENTION

A phonograph device comprising a housing, an acoustical sound reproducing means pivotally mounted in said housing for swinging movement relative thereto, said means comprising a diaphragm mounting a stylus at its apex, means defining an opening in said housing in position for extension of said stylus therethrough, and said sound reproducing means being formed so that its center of gravity is eccentric with respect to its pivot axis, so that as said housing is tilted upwardly from a horizontal position said stylus automatically moves to a predetermined one side of said housing opening.

DESCRIPTION OF THE PREFERRED EMBODIMENT

Figure 1:
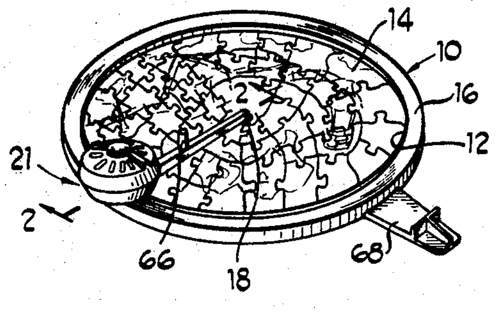
FIGURE 1 is a perspective view of the selected embodiment of the invention.

As seen particularly in FIGURE 1, the preferred embodiment of the invention comprises a generally circular frame 10 defining a large central area 12 receiving a jigsaw puzzle 14 and including a relatively narrow marginal portion having a recorded sound track 16 thereon. The center of frame 10 is provided with a pivot mounting 18 for receiving one end of an elongated arm portion

20 of a sound reproducing device 21 positioned for movement through the circular path of the sound track 16. After the child has assembled the pieces of the jigsaw puzzle 14 to provide a particular illustration or picture, he can listen to an appropriate message, which is specifically related to the illustrated puzzle, by turning the arm 20 in a circular manner about the pivot mounting.

The frame 10 is preferably formed of plastic, or other suitable material, and the large central area 12 for receiving the jigsaw puzzle 14 is defined by a bottom wall 22 and a circular side wall 24. The center of bottom wall 22 is formed with a vertically extended cylindrical boss 26 which provides the pivot mounting 18 for the arm 20 of the phonograph device. The circumferential marginal portion of the frame is provided with a separate circular recess defined by a bottom wall 28, the side wall 24 and an outer side wall extension 30. A spirally wound sound track 16, preferably formed also of plastic or other suitable material, is positioned within the recess and is preferably removable therefrom. However, if desired, the sound recording might be formed directly on the bottom wall 28 of the marginal portion of the puzzle frame 10.

The sound reproducing device 21 comprises the elongated arm 20 having a spindle or shaft-like portion 32 formed on one end and adapted to be inserted in the pivot mounting 26 on the frame. In this connection, the pivot mounting 26 serves primarily as a locating means, and the fit between the pivot mounting and the spindle 32 should be sufficiently loose to permit tilting of the arm 20 upwardly, so as to elevate the sound reproducing device 21 above the frame structure 10 and the sound track 16 thereon. The sound reproducing device 21 comprises a plastic shell or housing 34 which is generally circular in transverse cross section. At least the upper wall 36 of the housing is desirably provided with openings 38 to permit the passage of sound therethrough. Opposite sides of the generally circular side wall 40 are provided with a pair of slotted, aligned openings 42, and an acoustical type of sound pick-up unit is pivotally mounted within the housing by means of aligned portions 44 thereof extending into the openings 42 in the housing 34. The pivot mounting portions 44 are formed at the upper end or top of a generally cylindrical plastic frame 46 which supports a generally conically shaped diaphragm 48.

The diaphragm 48 includes a circular, outer rim portion 50 which is fixed to a circular ledge 52 formed interiorly of the diaphragm supporting frame 46. The apex of the conical diaphragm has secured thereto a generally cylindrical piece 54, preferably plastic, having mounted therein a stylus or needle 56. The lower portion of the outer housing 21 includes a slotted opening 58 affording projection of the stylus through the housing. Further, the bottom wall of the diaphragm mount 46 is provided with a circular opening 60 sufficiently large to receive the apex of the cone, with stylus mount 54 being braced against any substantial movement by a thin rib 59 extending transversely of the bottom portion of frame 46. It being understood, of course, that mount 54 is sufficiently resiliently held in place to provide for transmitting vibrations from stylus 56 to diaphragm 48. The opening 58 through the bottom of the housing 34 is sufficiently long to permit lateral movement of the needle 56 across the width of the record or sound track 16 as the pickup 21 is pivoted about the center axis of the frame 10 and the needle follows the spirally wound grooves in the record. The inner edge of the needle opening 58 is essentially in line with the initial cut of the sound groove in the inner end of the circular record 16.

Figure 2:
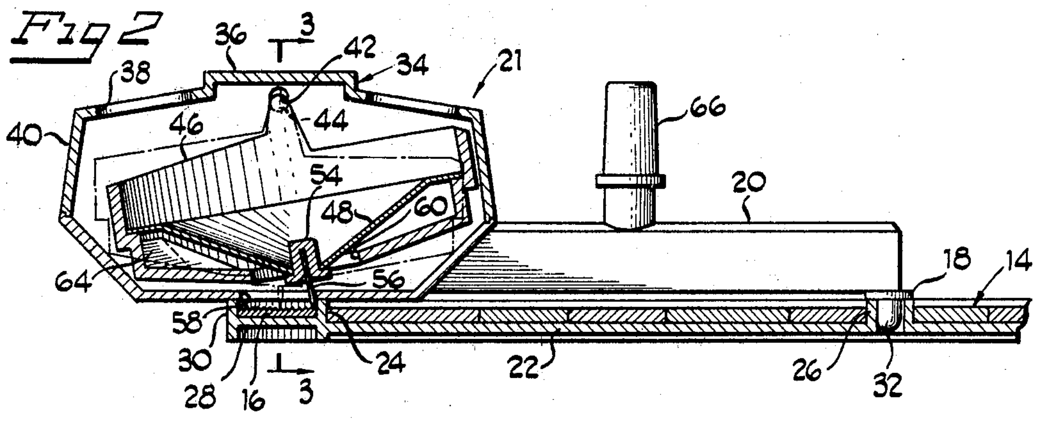
FIGURE 2 is an enlarged sectional view taken generally along the line 2—2 in FIGURE 1.
Figure 3:
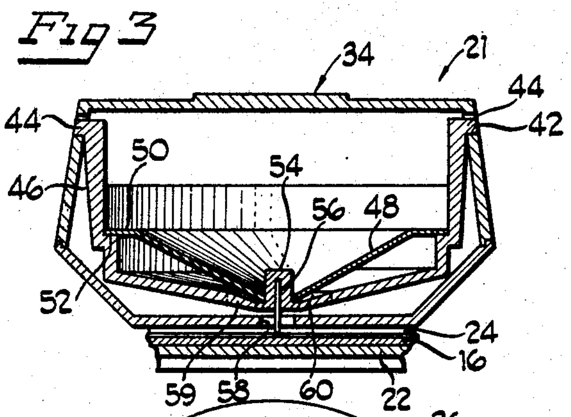
FIGURE 3 is a sectional view taken along the line 3—3 in FIGURE 2.
Figure 5:
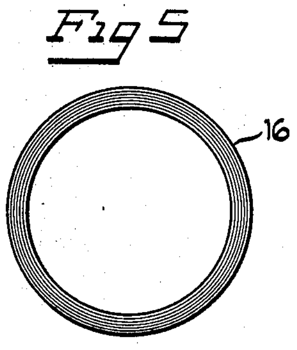
FIGURE 5 is a plan view of the record portion of the device, reduced in scale.
Figure 4:
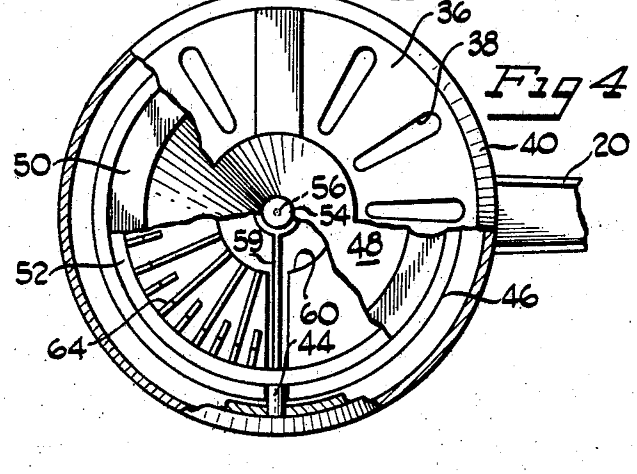
FIGURE 4 is a fragmentary top plan view of the device shown in FIGURES 1-3, with parts broken away and in section.

The diaphragm mount 46 is provided with additional weight on its outer side, that is the side to the left in FIGURE 2, so that as the arm 20 and pick-up 21 are tilted upwardly about the pivot mount 26, the diaphragm mount 46 and the stylus 56 swing inwardly toward the center of the frame 10 to position the needle at the inner edge of the slotted opening 58. The eccentric weight of diaphragm mount 46 is sufficiently great to maintain the needle in this innermost position as the pick-up 21 is again lowered to a position of rest on the top edge of the vertically extending flanges 24, 30 defining the record path. Consequently, as the pick-up unit 21 is lowered, the needle 56 comes to rest in the initial groove or cut in the record 16. In this connection it will be noted that the described record is played from inside to outside in contrast with the ordinary record wherein the entry groove is along the outer circumference of the record. In the illustrated embodiment the additional and eccentrically positioned weight is provided by means of ribs 64 which extend radially of the diaphragm mount 46. As noted in FIGURE 4, the ribs 64 are only on the left side of the pivot axis provided by pins 44 and, therefore, provide the required eccentricity referred to above.

In order to facilitate handling of the described device by a very small child, the phonograph arm 20 is provided with a handle in the form of a vertically extending stem 66 formed integrally with the arm. Furthermore, the frame or housing 10 for the puzzle has fastened thereto a handle-like member 68 which may also be grasped by the child to stabilize the frame during the use of the phonograph. It is also to be noted that the stylus or needle 56 projects from the housing 34 a distance just sufficient to permit engagement with the record 16 and effectively transmit the sounds recorded thereon through the diaphragm 48, but the illustrated arrangement does not permit any undue penetration of the record by the needle. The bottom of the pick-up housing 34 rests on the vertically extending walls 24 and 30 enclosing the record 16 and consequently there is provided a predetermined amount of projection of the needle so as to protect the record. Since the pick-up housing 34 and the circular frame 10 are of plastic, or other suitably smooth material, the pick-up is easily slidable along the upper edges of the walls 24, 30 as the phonograph device is rotated. Moreover, the needle pressure on the record 16 is controlled automatically by virtue of the described construction, so that the weight of frame 46 and cone 48 determines the amount of pressure the stylus 56 exerts on the sound track.

Since both the jigsaw puzzle pieces and the record 16 related thereto are removable from frame 10, a plurality of different puzzles and records can be provided with a single frame 10 and phonograph unit 21. However, if desired, the sound track 16 can be integrally formed with frame 10 in the molding of the latter and a single accompanying puzzle provided.

Although shown and described with respect to particular apparatus, it will be apparent that various modifications might be made without departing from the principles of this invention.

What is claimed is:

1. A phonograph device comprising a frame supporting a circular record, an acoustical sound reproducing means including an arm pivotally supported at one end at the center of said record on said frame for swinging movement through a circular path generally parallel to said record, a pick-up unit fixed to the other end of said arm and comprising a housing, a generally conical diaphragm pivotally mounted in said housing for swinging movement relative thereto about an axis generally perpendicular to the longitudinal axis of said arm, a stylus mounted at the apex of said diaphragm, means defining an opening in the lower wall of said housing in position to permit extension of said stylus therethrough and enlarged in the direction of the longitudinal axis of the arm and affording pivotal movement of said stylus and diaphragm relative to said housing, said diaphragm being constructed so that its center of gravity is eccentric with respect to its pivot axis so as to bias said stylus against one side of said opening in said housing, so that said stylus is positioned in the starting groove of the record as it is lowered into engagement therewith, whereby said stylus and diaphragm is free to move radially of the record as said arm is moved through a circular path with said stylus engaging the record groove, and said stylus returns to its initial position against said one side of said opening when lifted out of engagement with the record.

2. A phonograph device as set forth in claim 1, wherein said frame is generally circular, said record is an annular member secured in said frame, and including a circular jigsaw puzzle disposed on said frame within said annular record.

3. A phonograph device as set forth in claim 2, wherein said record is provided with a helical sound track beginning at the inner diameter of the record and terminating adjacent the outer diameter of said record, and said diaphragm is eccentrically weighted so as to bias said stylus in the direction of said inner diameter of said record.

4. A phonograph device as set forth in claim 1, wherein said frame is generally circular and includes an annular recess portion adjacent its outer circumference, said record is annular in shape and removably inserted in said annular recess, and said arm is pivotally supported at the center of said frame by means including a depending cylindrical post on said one end of said arm and a cooperable, cylindrical boss fixed to the center of said frame in vertically extending relation thereto.

References Cited

UNITED STATES PATENTS

| | | | |
|---|---|---|---|
| 1,437,472 | 12/1922 | Maier | 274—1.2 |
| 1,485,137 | 2/1924 | Hunter | 274—1.1 |
| 2,982,552 | 5/1961 | Kent | 274—1.1 |
| 3,220,143 | 11/1965 | Van Den Hurk | 274—1.1 |

LEONARD FORMAN, Primary Examiner

DENNIS A. DEARING, Assistant Examiner

U.S. Cl. X.R.

274—1